UNITED STATES PATENT OFFICE.

SILAS C. LINBARGER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

GRAPHITE ARTICLES AND METHOD OF MAKING THE SAME.

1,339,266.      Specification of Letters Patent.      Patented May 4, 1920.

No Drawing.      Application filed December 13, 1918. Serial No. 266,639.

*To all whom it may concern:*

Be it known that I, SILAS C. LINBARGER, residing at Niagara Falls, in the county of Niagara and State of New York, have invented a new and useful Improvement in Graphite Articles and Methods of Making the Same, of which the following is a full, clear, and exact description.

This invention refers to refractory articles containing graphite and has for its object the making of such articles so that they will have higher durability and be able to withstand to a greater degree the action of oxidizing conditions. Refractory articles of graphite, for example, graphite crucibles are now usually made by mixing flake or granular graphite with a certain percentage of fire clay, molding same into shape and firing the kiln. When such crucibles are put into use, for example in the melting of metals, the furnace gases on the exterior of the crucible are generally highly oxidizing and there is a continuous oxidation of the graphite inward from the exterior of the crucible. When this graphite is oxidized there is left only the clay structure which is far less refractory than the original structure containing graphite. The pores made by the combustion of the graphite admit fluxing impurities from the flames and there is in some cases a spalling off of the crucible body thereby limiting its life.

The object of my invention is to introduce into the mixture certain substances which have the property of retarding or preventing the oxidation of the graphite. I use for this purpose certain alkali compounds such as sodium silicate. This apparently forms a film over the graphite and I have found that the oxidation of the same is greatly retarded. Natural graphite never occurs in the pure state, but is always associated with mineral impurities such as silica, iron oxid and complex aluminum silicates. It is believed that the sodium silicate acts on the mineral impurities which are associated with the graphite in such manner as to form a glass or glaze over the surface of the particles, in this way preventing the oxygen from coming into contact with the graphite. In the manufacture of crucibles, I have used the following mixture:

| | | |
|---|---|---|
| Ceylon graphite | 65 parts. | |
| Clay | 30 parts. | |
| Sodium silicate | 5 parts. | |

The clay may be any good grade of plastic fire clay suitable for the manufacture of crucibles and the silicate of soda is preferably of liquid form of about 60 degrees Baumé. After mixing, the articles are molded in the usual manner, dried and fired in the kiln. In place of sodium silicate, I have used other sodium compounds such as sodium chlorid, sodium carbonate and sodium sulfate. Potassium compounds are equally efficient and I do not limit myself to any particular alkali compound.

Many other refractory articles ordinarily produced from graphite such as condensers, nozzles, stoppers, etc., can be advantageously produced with the method I have discovered. Such graphite articles are very much more durable than the ordinary graphite articles and the expense of manufacture is not appreciably increased.

I am aware of the patent to Robert Spencer, No. 84,143, in which it is proposed to make a mixture of plumbago, fire-clay and sodium silicate, the sodium silicate being in so large a proportion as to render the mixture liquid or plastic. I do not use in my mix a quantity of sodium silicate sufficient to render the mixture liquid or plastic like that of the Spencer patent. The sodium silicate which I use is not used for the purpose of a binder but merely to form a superficial flux on the graphite particles. This small amount of sodium silicate is not sufficient to give any appreciable binding or adhesive properties to the mixture.

The present invention is not limited to the preferred embodiment above described but may be embodied in other compositions of matter and methods within the scope of the following claims.

I claim:

1. That step in the method of making graphite articles which consists in mixing graphite, clay and an amount of a clay fluxing alkali compound sufficient to form a protective film over the graphite particles in the subsequent step of firing the article, but insufficient to give any appreciable binding or adhesive properties to the mixture, substantially as described.

2. That step in the method of making granular graphite articles which consists in mixing graphite, clay and an amount of a clay fluxing compound sufficient to form a protective film over the graphite particles in the subsequent step of firing the article, but insufficient to give any appreciable binding or adhesive properties to the mixture, substantially as described.

3. The method of making graphite articles comprising fluxing an oxidizing preventive film over the graphite particles, substantially as described.

4. The method of making graphite articles, comprising mixing graphite, clay and an amount of a clay fluxing alkali compound sufficient to form a protective film over the graphite particles in the subsequent step of firing the article but insufficient to render the mixture liquid or plastic, and thereafter molding the mixture in the usual manner and firing it, substantially as described.

5. The herein described refractory body containing graphite, clay and a clay fluxing compound in a proportion sufficient to form a thin film or glaze over the graphite particles, substantially as described.

6. The herein described refractory body containing graphite, clay and sodium silicate in a proportion sufficient to form a thin film or glaze over the graphite particles, substantially as described.

7. The herein described refractory body containing graphite particles coated with a thin oxidation preventing film, substantially as described.

8. That step in the method of making graphite articles which consists in mixing graphite and clay with not substantially more than five per cent. of a clay fluxing alkali compound, and molding and firing the mixture, substantially as described.

9. That step in the method of making graphite articles which consists in mixing graphite in clay with not substantially more than five per cent. of sodium silicate and molding and firing the mixture, substantially as described.

In testimony whereof I have hereunto set my hand.

SILAS C. LINBARGER.